(12) United States Patent
Kerschbaum et al.

(10) Patent No.: US 9,213,764 B2
(45) Date of Patent: Dec. 15, 2015

(54) ENCRYPTED IN-MEMORY COLUMN-STORE

(71) Applicants: Florian Kerschbaum, Karlsruhe (DE); Martin Haerterich, Wiesloch (DE); Mathias Kohler, Stutensee (DE); Isabelle Hang, Karlsruhe (DE); Andreas Schaad, Karlsruhe (DE); Axel Schroepfer, Rheinstetten (DE); Walter Tighzert, Heidelberg (DE); Patrick Grofig, Karlsruhe (DE)

(72) Inventors: Florian Kerschbaum, Karlsruhe (DE); Martin Haerterich, Wiesloch (DE); Mathias Kohler, Stutensee (DE); Isabelle Hang, Karlsruhe (DE); Andreas Schaad, Karlsruhe (DE); Axel Schroepfer, Rheinstetten (DE); Walter Tighzert, Heidelberg (DE); Patrick Grofig, Karlsruhe (DE)

(73) Assignee: SAP SE, Walldorf, DE (US)

( * ) Notice: Subject to any disclaimer, the term of this patent is extended or adjusted under 35 U.S.C. 154(b) by 286 days.

(21) Appl. No.: 14/088,051

(22) Filed: Nov. 22, 2013

(65) Prior Publication Data

US 2015/0149427 A1 May 28, 2015

(51) Int. Cl.
*G06F 17/30* (2006.01)
*G06F 21/62* (2013.01)

(52) U.S. Cl.
CPC ...... *G06F 17/30864* (2013.01); *G06F 21/6227* (2013.01)

(58) Field of Classification Search
CPC ............... G06F 17/30864; G06F 17/30477; Y10S 707/99934; Y10S 707/99941
See application file for complete search history.

(56) References Cited

U.S. PATENT DOCUMENTS

| | | | |
|---|---|---|---|
| 6,915,290 B2* | 7/2005 | Bestgen | G06F 17/30436 |
| 7,797,342 B2* | 9/2010 | Banks | G06F 17/30595 |
| | | | 707/783 |
| 8,515,058 B1* | 8/2013 | Gentry | H04L 9/008 |
| | | | 380/28 |
| 2004/0255133 A1 | 12/2004 | Lei et al. | |
| 2012/0159180 A1 | 6/2012 | Chase et al. | |
| 2013/0191650 A1 | 7/2013 | Balakrishnan et al. | |

OTHER PUBLICATIONS

Craig Gentry, "A Fully Homomorphic Encryption Scheme", Google Scholar, pp. 1-209, Sep. 2009.*
Murali Mani, "Enabling Secure Query Processing in the Cloud using Fully Homomorphic Encryption", ACM, Jun. 23, 2013, pp. 36-40, Proceedings of the Second Workshop on Data Analytics in the Cloud.*
Popa et al.: "CrypDB: Protecting Confidentiality with Encrypted Query Processing"; Operating Systems Principles; ACM; 2 Penn Plaza, Suite 701, New York NY 10121-0701; Oct. 23, 211; pp. 85-100.

(Continued)

*Primary Examiner* — Cheryl Lewis
(74) *Attorney, Agent, or Firm* — Fountainhead Law Group PC

(57) ABSTRACT

Embodiments relate to processing encrypted data, and in particular to identifying an appropriate layer of encryption useful for processing a query. Such identification (also known as the onion selection problem) is achieved utilizing an adjustable onion encryption procedure. Based upon defined requirements of policy configuration, alternative resolution, and conflict resolution, the adjustable onion encryption procedure entails translating a query comprising an expression in a database language (e.g. SQL) into an equivalent query on encrypted data. The onion may be configured in almost arbitrary ways directing the onion selection. An execution function introduces an execution split to allow local (e.g. client-side) query fulfillment that may otherwise not be possible in a secure manner on the server-side. A searchable encryption function may also be employed, and embodiments accommodate aggregation via homomorphic encryption. Embodiments may be implemented as an in-memory column store database system.

20 Claims, 11 Drawing Sheets

(56) References Cited

OTHER PUBLICATIONS

Extended European Search Report for EP14003274.9 dated Dec. 11, 2014.

R. Agrawal, J. Kiernan, R. Srikant, and Y. Xu., "Order preserving encryption for numeric data." In Proceedings of the ACM International Conference on Management of Data (SIGMOD), 2004.

M. Bellare, A. Boldyreva, and A. O'Neill. "Deterministic and efficiently searchable encryption." In Advances in Cryptology (CRYPTO), 2007.

M. Blaze, G. Bleumer, and M. Strauss. "Divertible protocols and atomic proxy cryptography." In Advances in Cryptology (EUROCRYPT), 1998.

A. Boldyreva, N. Chenette, Y. Lee and A. O'Neill. "Order-preserving symmetric encryption." In Advances in Cryptology (EUROCRYPT), 2009.

A. Boldyreva, N. Chenette, and A. O'Neill. "Order-preserving encryption revisited: improved security analysis and alternative solutions," In Advances in Cryptology (CRYPTO), 2011.

R. Curtmola, J Garay, S. Kamara, and R. Ostrovsky. "Searchable symmetric encryption: improved definitions and efficient constructions." In Proceedings of the 13th ACM Conference on Computer and Communications Security (CCS), 2006.

F. Faerber, N. May, W. Lehner, P. Groe, I. Mueller, H. Rauhe, and J. Dees. "The SAP HANA database—an architecture overview." IEEE Data Engineering Bulletin 35(1), 2012.

S. Goldwasser, and S. Micali. "Probabilistic encryption." Journal of Computer and Systems Sciences 28(2), 1984.

H. Hacigumus, B. Iyer, C. Li, and S. Mehrotra. "Executing SQL over encrypted data in the database-service-provider model." In Proceedings of the ACM International Conference on Management of Data (SIGMOD), 2002.

H. Hacigumus. B. Iyer, and S. Mehrotra. "Providing database as a service." In Proceedings of the 18th IEEE International Conference on Data Engineering (ICDE), 2002.

M. Islam, M. Kuzu, and M. Kantarcioglu. "Access pattern disclosure on searchable encryption: ramification, attack and mitigation." In Proceedings of the 19th Network and Distributed system Security Symposium (NDSS), 2012.

S. Kamara C. Papamanthou, and T. Roeder. "Dynamic searchable symmetric encryption." In Proceedings of the 19th ACM Conference on Computer and Communications Security (CCS), 2012.

F. Kerschbaum. "Building a privacy-preserving benchmarking enterprise system." Enterprise Information Systems 2(4), 2008.

F. Kerschbaum. "Automatically optimizing secure computation." In Proceedings of the 18th ACM Conference on Computer and Communications Security (CCS), 2011.

F. Kerschbaum, P. Grofig, I. Hang, M. Haerterich, M. Kohler, A. Schaad, A. Schreopfer, and W. Tighzert. "Demo: Adjustably encrypted in-memory column-store." In Proceedings of the 20th ACM Conference on Computer and Communications Security (CCS), 2013.

F. Kerschbaum, M. Haerterich, P. Grofig, M. Kohler, A. Schaad, A. Schreopfer, and W. Tighzert. "Optimal re-encryption strategy for joins in encrypted databases." In Proceedings of the 27th IFIP Conference on Data and Applications Security (DBSEC), 2013.

F Kerschbaum, and O. Terzidis. "Filtering for private collaborative benchrnarking." In Proceedings of the International Conference on Emerging Trends in Information and Communication Security (ETRICS), 2006.

P. Paillier. "Public-key cryptosystems based on composite degree residuosity classes." In Advances in Cryptology (EUROCRYPT), 1999.

R. Pibernik, Y. Zhang, F. Kerschbaum, and A. Schroepfer. "Secure collaborative supply chain planning and inverse optimization—the jels model." European Journal of Operational Research 208(1), 2011.

S. Pohlig, and M. Hellman. "An improved algorithm for computing logarithms over GF(p) and its cryptographic significance." IEEE Transactions on information Theory 24, 1978.

R. Popa, F. Li, and N. Zeldovich. "An ideal-security protocol for order-preserving encoding." In Proceedings of the 34th IEEE Symposium on Security and Privacy (SP), 2013.

R. Popa, C. Redfield, N. Zeldovich, and H. Balakrishnan. "CryptDB: Protecting confidentiality with encrypted query processing." In Proceedings of the 23rd ACM Symposium on Operating Systems Principles (SOSP), 2011.

E. Shi, J. Bethencourt, H. Chan, D. Song, and A. Perrig. "Multi-dimensional range query over encrypted data." In Proceedings of the 28th IEEE Symposium on Security and Privacy (SP), 2007.

D. Song, D. Wagner, and A. Perrig. "Practical techniques for searches on encrypted data." In Proceedings of the 21st IEEE Symposium on Security and Privacy (SP), 2000.

\* cited by examiner

ENCRYPTED IN-MEMORY COLUMN-STORE

BACKGROUND

Embodiments relate to encryption, and in particular, to processing of queries over encrypted data.

Unless otherwise indicated herein, the approaches described in this section are not prior art to the claims in this application and are not admitted to be prior art by inclusion in this section.

Security may pose an obstacle to widespread adoption of data handling in the cloud. Specifically, criminal hackers or foreign government organizations may try to gain access to data that is stored in the cloud.

Encryption of data may provide a solution to this issue. However, such encryption may also interfere with the use of such encrypted data, for example computation utilizing the encrypted data in the cloud.

Accordingly, a current subject of research investigates the processing of the data that remains in encrypted form.

One manner of providing software on the cloud, is Database-as-a-Service (DaaS). In such a product, a service provider offers database storage and query capabilities (e.g., through an SQL interface), and then charges a user for storage and computation.

Such a DaaS scheme is less valuable, if query processing is limited to the client side, and only storage is performed in the cloud. By contrast, a DaaS scheme that allows queries to be performed on data that remains encrypted, would provide greater value by permitting processing of that data on the cloud.

Thus, there is a need for systems and methods allowing processing of queries over encrypted data.

SUMMARY

Embodiments relate to processing encrypted data, and in particular to identifying an appropriate layer of encryption useful for processing a query. Such identification (also known as the onion selection problem) is achieved utilizing an adjustable onion encryption procedure. Based upon defined requirements of policy configuration, alternative resolution, and conflict resolution, the adjustable onion encryption procedure entails translating a query comprising an expression in a database language (e.g. SQL) into an equivalent query on encrypted data. The onion may be configured in almost arbitrary ways directing the onion selection. An execution function introduces an execution split to allow local (e.g. client-side) query fulfillment that may otherwise not be possible in a secure manner on the server-side. A searchable encryption function may also be employed, and embodiments accommodate aggregation via homomorphic encryption. Embodiments may be implemented as an in-memory column store database system.

A computer-implemented method according to an embodiment comprises providing a database comprising encrypted plaintext, causing an engine to receive a first input comprising a database query including an expression, and causing the engine to receive a second input comprising the plaintext encrypted according to a first encryption scheme. The engine is caused to receive a third input comprising the plaintext encrypted according to a second encryption scheme. The engine is caused to process the expression, the first encryption scheme, and the second encryption scheme according to an algorithm in order to select an encrypted layer on which to execute the database query.

An embodiment of a non-transitory computer readable storage medium embodies a computer program for performing a method. The method comprises providing a database comprising encrypted plaintext, causing an engine to receive a first input comprising a database query including an expression, and causing the engine to receive a second input comprising the plaintext encrypted according to a first encryption scheme. The engine is caused to receive a third input comprising the plaintext encrypted according to a second encryption scheme, and the engine is caused to process the expression, the first encryption scheme, and the second encryption scheme according to an algorithm in order to select an encrypted layer on which to execute the database query.

An embodiment of a computer system comprises one or more processors and a software program executable on said computer system and configured to provide a database comprising encrypted plaintext. The software is configured to cause an engine to receive a first input comprising a database query including an expression, and configured to cause the engine to receive a second input comprising the plaintext encrypted according to a first encryption scheme. The engine is further configured to cause the engine to receive a third input comprising the plaintext encrypted according to a second encryption scheme, and to cause the engine to process the expression, the first encryption scheme, and the second encryption scheme according to an algorithm in order to select an encrypted layer on which to execute the database query.

According to certain embodiments the algorithm comprises building a graph of columns used in the database query, and for each graph node, selecting a maximum encrypted layer that can fulfill the database query. The algorithm further comprises selecting a minimum encrypted layer necessary for each connected component, choosing a remaining encryption most efficient for database operation, and scanning an operator tree of the database query from leaves to root. The database may be on a server, and upon encountering a conflict an upper part of the operator tree is executed on a client.

In an embodiment the engine processes the expression to further output an encrypted database query to execute on the encrypted layer, and the method further comprises executing the encrypted database query on the encrypted layer to produce an encrypted query result.

In various embodiments the expression comprises aggregation, and the selected encryption layer comprises homomorphic encryption.

According to some embodiments the expression comprises a bound, and the selected encryption layer comprises order preserving encryption.

In particular embodiments the expression comprises a search function, and the selected encryption layer comprises searchable encryption.

In certain embodiments plaintext of the selected encryption layer is initially encrypted by order preserving encryption.

The following detailed description and accompanying drawings provide a better understanding of the nature and advantages of various embodiments.

DETAILED DESCRIPTION

Figure 1:
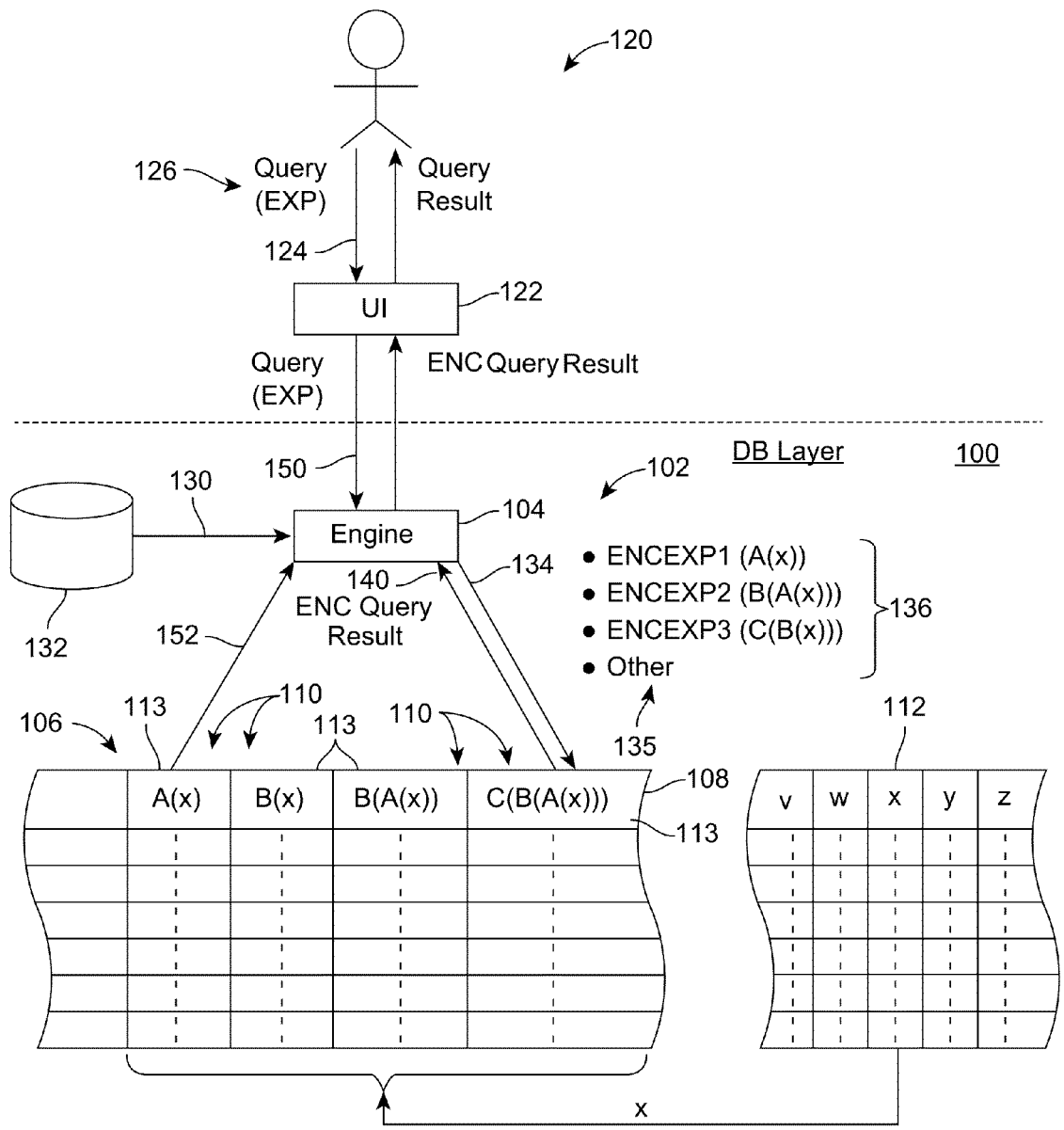
FIG. 1 shows a simplified view of a system according to an embodiment.

Described herein are techniques for providing querying of encrypted data. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Previously, ciphertexts have been used to allow processing of queries over encrypted data. Relational database operators have been adapted to allow for processing over such encrypted data.

Binning was introduced as a method to handle range queries. In binning, values are put in larger bins and all bins of a range are queried using equality matching.

Values which are in the selected bins, but are not in the range, are filtered using client post processing. Binning allows implementing range queries using the same relational operators as used in plaintext databases.

The binning approach was subsequently improved by order-preserving encryption. That technique preserves the order of the plaintexts in the ciphertexts. Databases encrypted using order-preserving encryption can already perform most queries (except aggregation) without modification of the database operators.

A random order-preserving function represented a next step in the evolution of approaches for querying encrypted data. This random order-preserving function mapped a smaller domain to a larger domain, while preserving the order of the inputs. However, such random order-preserving functions may undesirably allow a large proportion of the upper half of the plaintext bits to leak to a passive observer.

Ideal security for order-preserving encryption, permits nothing to be leaked except the order. Thus a desirable security order-preserving encryption replaces the plaintexts by their order.

Such order-preserving encryption is a mapping of a smaller domain of plaintexts to a larger domain of ciphertexts. However, a challenge is to accommodate future plaintexts unforeseen when choosing the encryption.

To accomplish this, an interactive protocol to compute the ciphertexts was proposed. Such an approach allows revealing the order-preserving ciphertexts only when necessary for a specific query.

Specifically, onion layers of more secure encryption schemes are wrapped around the order-preserving ciphertext. These onion layers are only removed when a range query requiring order comparison is processed. Using this approach, most queries can be handled without resorting to order-preserving encryption.

As described herein, embodiments relate to adjustable onion processing of encrypted data, and in particular to identifying an appropriate layer of encryption for processing a query. Such identification (also known as the onion selection problem) is achieved utilizing an adjustable onion encryption procedure.

Based upon defined requirements of policy configuration, alternative resolution, and conflict resolution, the adjustable onion encryption procedure entails translating a Structure Query Language (SQL) query to an equivalent query on encrypted data. The onion may be configured in near-arbitrary ways directing the onion selection. A local execution function introduces a local execution split to accommodate queries not otherwise able to be fulfilled. A searchable encryption function may also be employed. One specific embodiment of an adjustable onion encryption procedure is implemented as an in-memory column store database system.

An adjustable onion encryption function according to embodiments, is now described in further detail. In particular, the term "onion" stems from the use of multiple layers to encrypt data. That is, the output (ciphertext) of one encryption type is fed as in input to another. The original, unencrypted data is referred to as plaintext.

FIG. 1 shows a simplified view of a system in accordance with an embodiment. System 100 comprises database layer 102 comprising an engine 104 that is in communication with data stored in a database 106.

Here, the database 106 comprises a table 108 having columns 110 that represent encryption of the same plaintext (x) according to various different encryption schemas (onions) 111. Shorthand examples of such encryption schemas include $A(x)$, $B(x)$, etc., where "x" represents the unencrypted plaintext. The table 108 may be derived from another table 112 having the plaintext as a single, unencrypted column 114.

The engine 104 is further in communication with a user 120 via a user interface (UI) 122. The user is configured to interact with the UI to prepare a query 124 of the information in the underlying database layer.

In certain embodiments, this query 124 may comprise one more expression(s) EXP 126 formulated in a database language. One common example of such a database language is Structured Query Language (SQL). Some examples of SQL expressions are listed in the table described later below in connection with the example.

Engine 104 is configured to receive as a first input 150, the query 124 including the query expression(s) EXP. Engine 104 is also configured to receive as a second input 152, the plaintext encrypted according to the various encryption data schemas 111.

Based upon these inputs, the engine 104 is configured to execute an algorithm 130 that may be present as code in a computer-readable storage medium 132, to produce at least one output 134. Details regarding one particular embodiment of an algorithm, are shown and further discussed in detail in connection with FIG. 4 below.

The output of the engine may comprise one or more encrypted queries 136 (e.g., in SQL) on which the respective onions (and layers thereof) are selected to be executed. Shorthand examples for such encrypted queries are ENCEXP1(A(x)), ENCEXP2(B(x)), ENCEXP3(B(A(x))), etc. As described in detail below, this onion selection can take into account considerations of both security and efficiency.

As is also discussed in detail below at least in connection with FIG. 3D, the output 134 may also include other information 135 that is used to update the database.

Execution of the encrypted queries on the database by the engine, produces an encrypted (ENC) query result 140. This encrypted query result 140 is returned from the engine to the UI (e.g. a client), for decryption, display, and ultimate consumption by the user.

Figure 2:
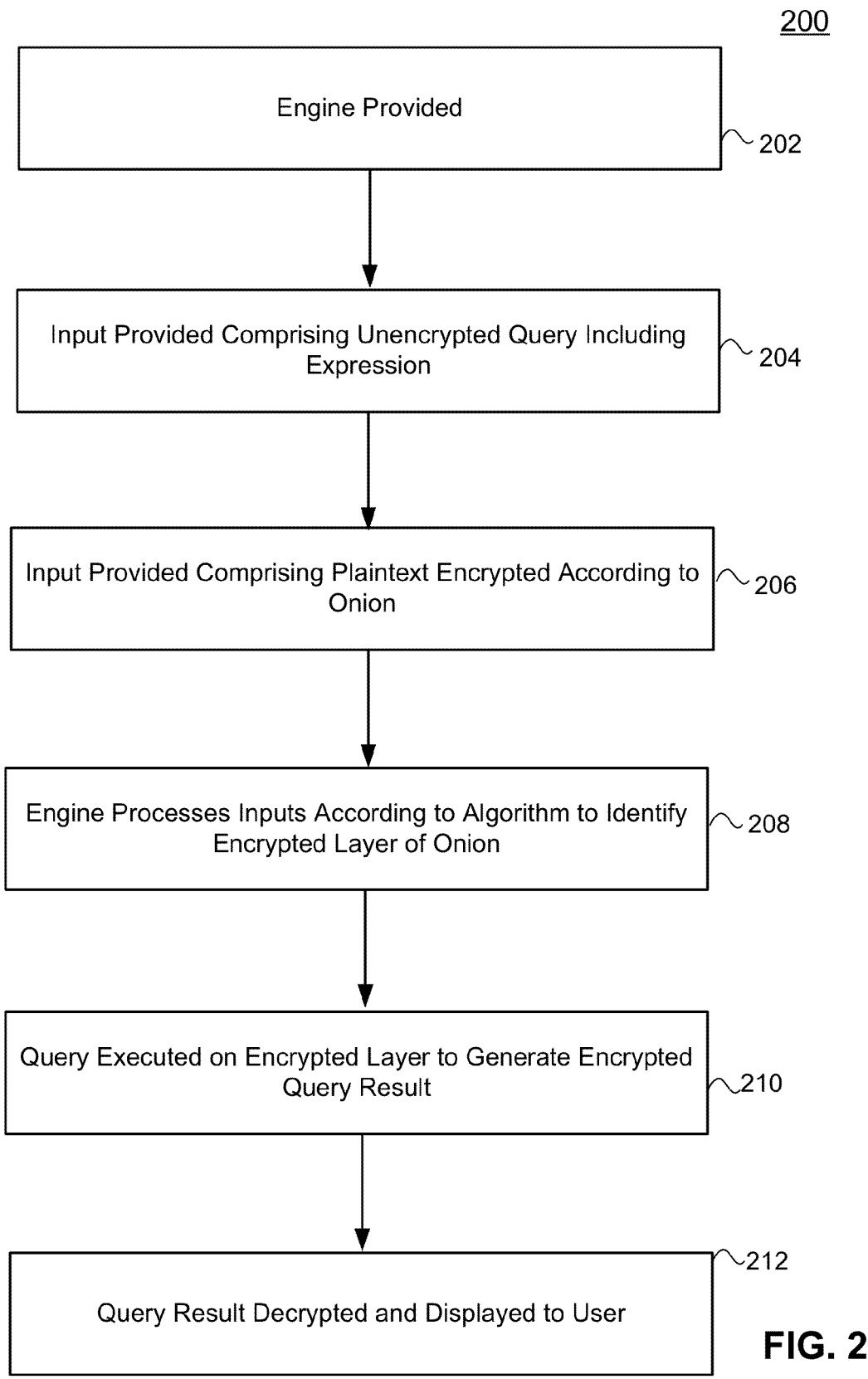
FIG. 2 is a simplified flow diagram illustrating steps of a process according to an embodiment.

FIG. 2 is a simplified diagram illustrating an embodiment of a process flow 200 according to an embodiment. In a first step 202, an engine is provided. In a second step 204, a first input comprising an unencrypted query including an expression, is provided to the engine.

In a third step 206, a second input comprising plaintext encrypted according to an encryption schema, is provided to the engine. In a fourth step 208, the engine processes the inputs according to an algorithm to produce as an output, an identified layer of one or more of the encrypted schemas (onions) on which the query is to be executed.

In an optional fifth step 210, an encrypted query is executed on the encrypted schema to generate a query result. In an optional sixth step 212, the query result is decrypted and displayed to a user.

According to certain embodiments, the engine may comprise the database engine of an in-memory database. Examples of such in-memory databases include but are not limited to the SYBASE IQ database also available from SAP AG, the Microsoft Embedded SQL for C (ESQL/C) database available from Microsoft Corp. of Redmond, Wash., and the Exalytics In-Memory database available from Oracle Corp. of Redwood Shores, Calif.

Another example of an in-memory database is the HANA in-memory database available from SAP AG of Walldorf, Germany. A specific example illustrating performance of onion selection in connection with in-memory column store of the HANA database, is now discussed.

Example

Figure 3A:
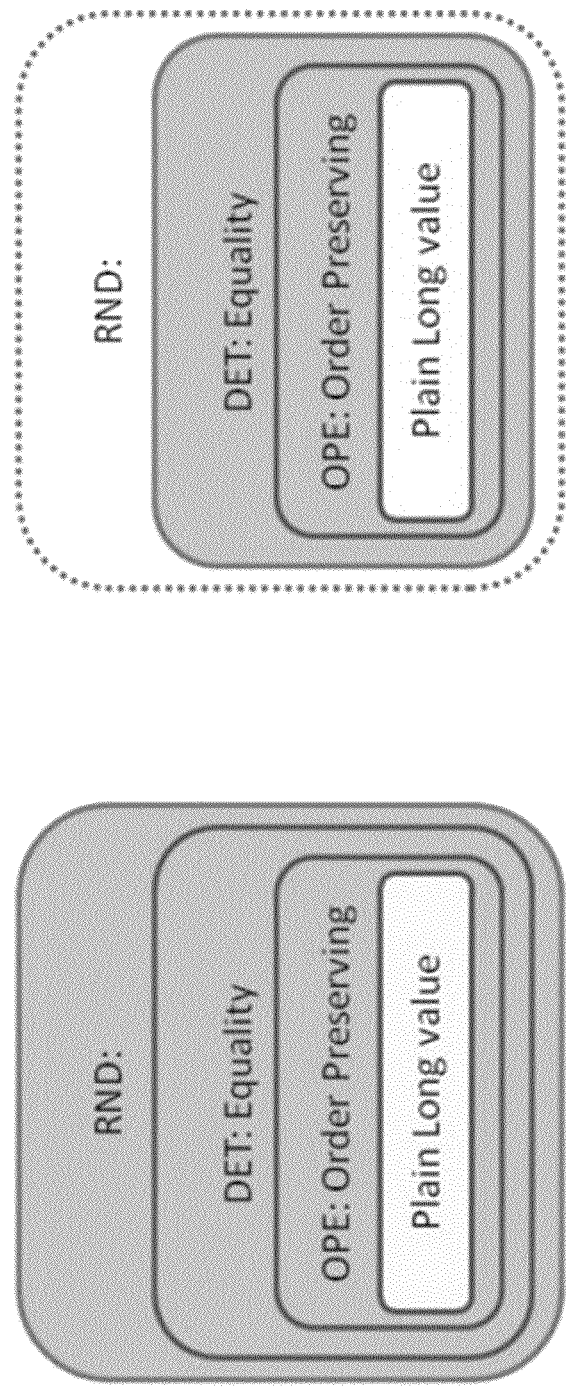
FIGS. 3A-F are simplified views showing an example of an embodiment performed in the context of one particular in-memory database system.

FIGS. 3A-F are simplified views illustrating an embodiment performed within the environment of the HANA in-memory database system. In particular FIG. 3A shows one example of plaintext (referred to here as "Plain long value"), encrypted according to a specific schema ("onion") comprising multiple encryption layers. Additional details regarding the various types of encryption layers, are provided later.

One plaintext column may be encrypted and stored on the database by multiple onions. Each onion comprises different layers. The center layer is always the plaintext. Each layer then encrypts the result of the previous layer with a specific type of encryption. FIG. 3A also shows peeling of the onion to remove the outermost encryption layer.

The particular onion in the example of FIG. 3A has a plaintext layer and three encryption layers with order-preserving encryption (OPE), deterministic encryption (DET), and random encryption (RND) types. However, another onion might have a plaintext layer and only one encryption layer featuring, for instance, homomorphic encryption. Still a third onion might have a plaintext layer and one encryption layer with searchable (SRC) encryption schema.

A fourth onion one might only have plaintext (PLN)+RND encryption layer. As is discussed in detail later below, this latter onion may hereafter be referred to as a "retrieval onion" (RET).

Each layer of an onion is used for a specific purpose in a SQL query. If the SQL query features a range-expression (e.g. "<", ">"), then either the OPE layer or the SRC layer is needed. As these layers reside on different onions, a choice needs to be made between these two onions.

As is described herein, the engine is configured to execute an algorithm in order to make this choice. In particular, the following table shows on example of a mapping between various query expressions in SQL, and suitable onion layers.

| SQL EXPRESSION | ONION LAYER |
| --- | --- |
| = (no JOIN) | DET/OPE/SRC |
| <, > | OPE/SRC |
| = (JOIN) | DET |
| SUM | HOM |
| GROUP BY | DET/OPE |
| ORDER BY | OPE |

Again, the identities and characteristics of the various onion layers, are discussed later in detail. It is also noted that possible layers for one SQL expression might be situated on different onions.

According to embodiments, the algorithm may use information in the above table, together with information on the state of the database, and also security considerations, in order to select the appropriate onion and onion layer for execution of the query.

Regarding information on the state of the database, such information may reflect that some layers might already be removed from an onion and not available anymore. Regarding security considerations, those reflect that some onion layers are more secure than others, based upon their encryption scheme.

Figure 3B:
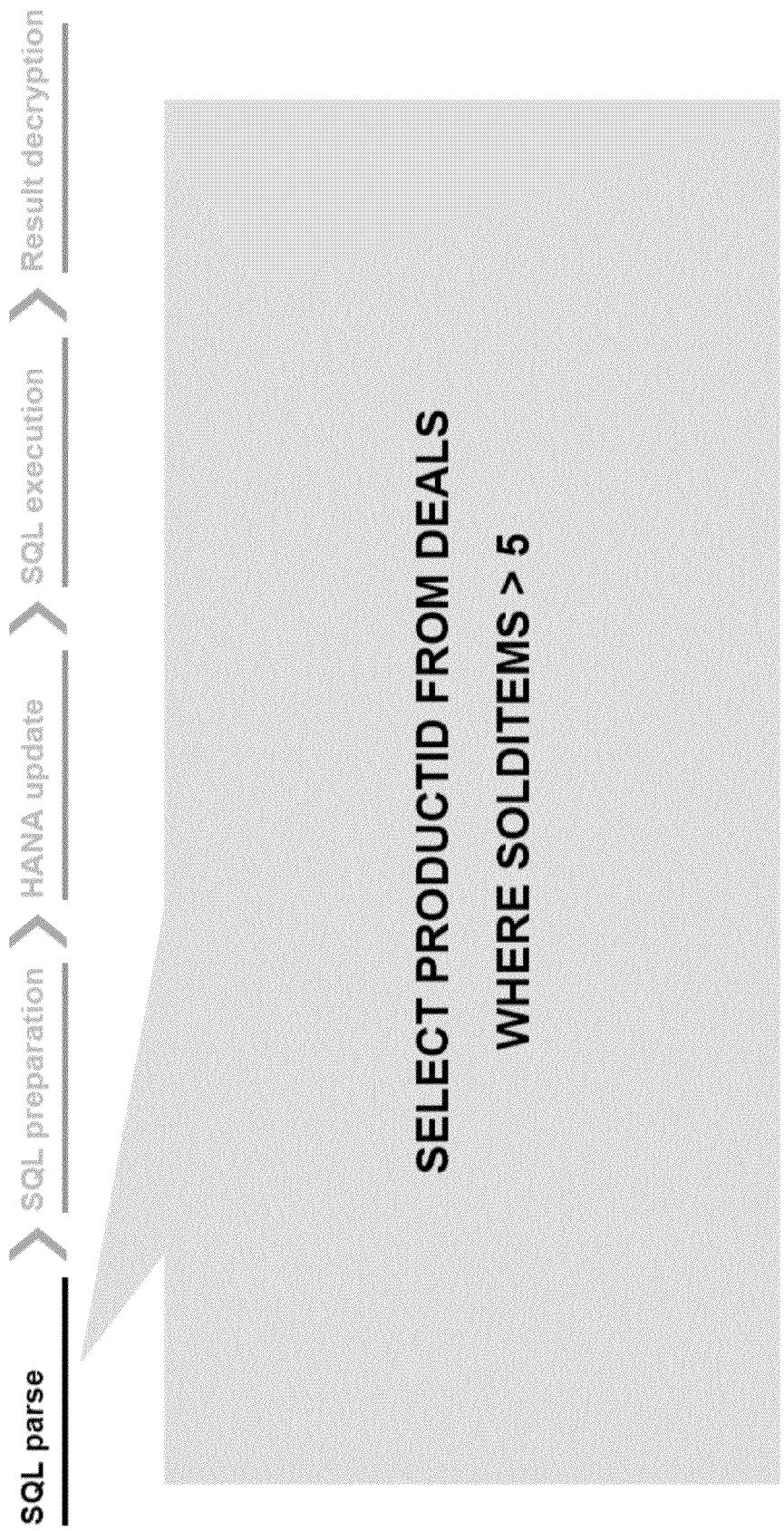

FIG. 3B shows a query parse of one example query that is to be executed according to an embodiment. In particular, this unencrypted SQL query seeks to:

SELECT PRODUCTID FROM DEALS WHERE
SOLDITEMS>5

Figure 3C:
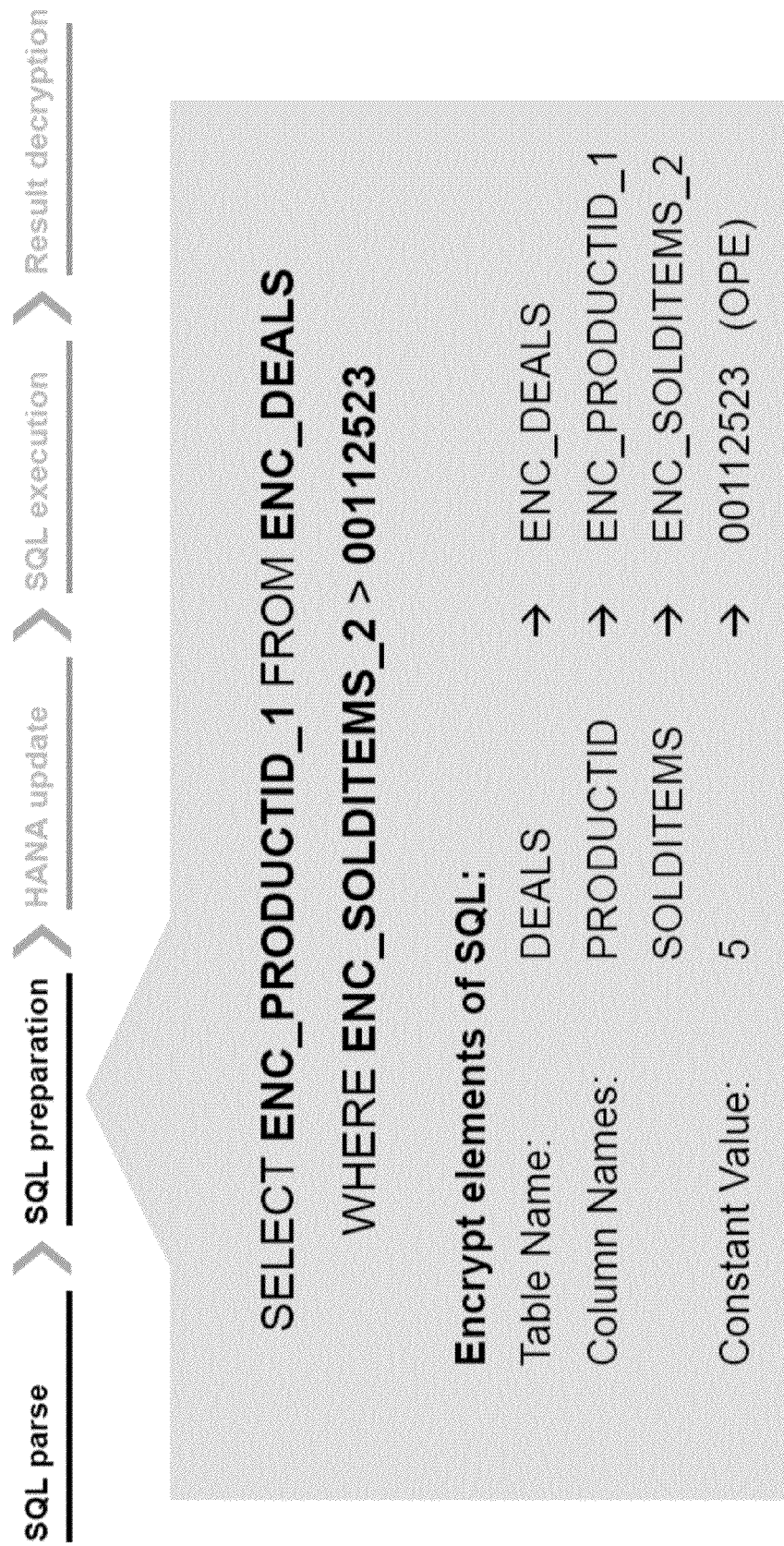

FIG. 3C shows a SQL preparation of this query. In particular, this figure identifies the various components of this unencrypted query. For this example, the following onion types are assumed:
1: PLN-RND (the retrieval onion)
2: PLN-OPE-DET-RND
3: PLN-HOM
4: PLN-SRC One plaintext column is stored in four different encrypted columns Each of these encrypted columns realizes a different onion type.

Given the unencrypted SQL query above, embodiments are able to make the onion (and layer) selection.

In this particular example, it is seen that the original column SOLDITEMS, is used with a greater-than expression (>). Hence, the onion featuring OPE->#2, is selected. This is indicated in FIG. 3C by the "2" appearing at the end of ENC_SOLDITEMS_2.

The column PRODUCTID only appears in the selector part of the SQL. Hence, the "retrieval onion" (here #1), is chosen.

While this particular example offers a simple, concrete example, it is noted that an algorithm will be tasked with more difficult situations. This is particularly true where multiple other criteria as current database state, security, and/or processing efficiency are also taken into account. Again, a full description of one embodiment of an algorithm considering such factors, is discussed later below specifically in connection with FIG. 4.

Figure 3D:
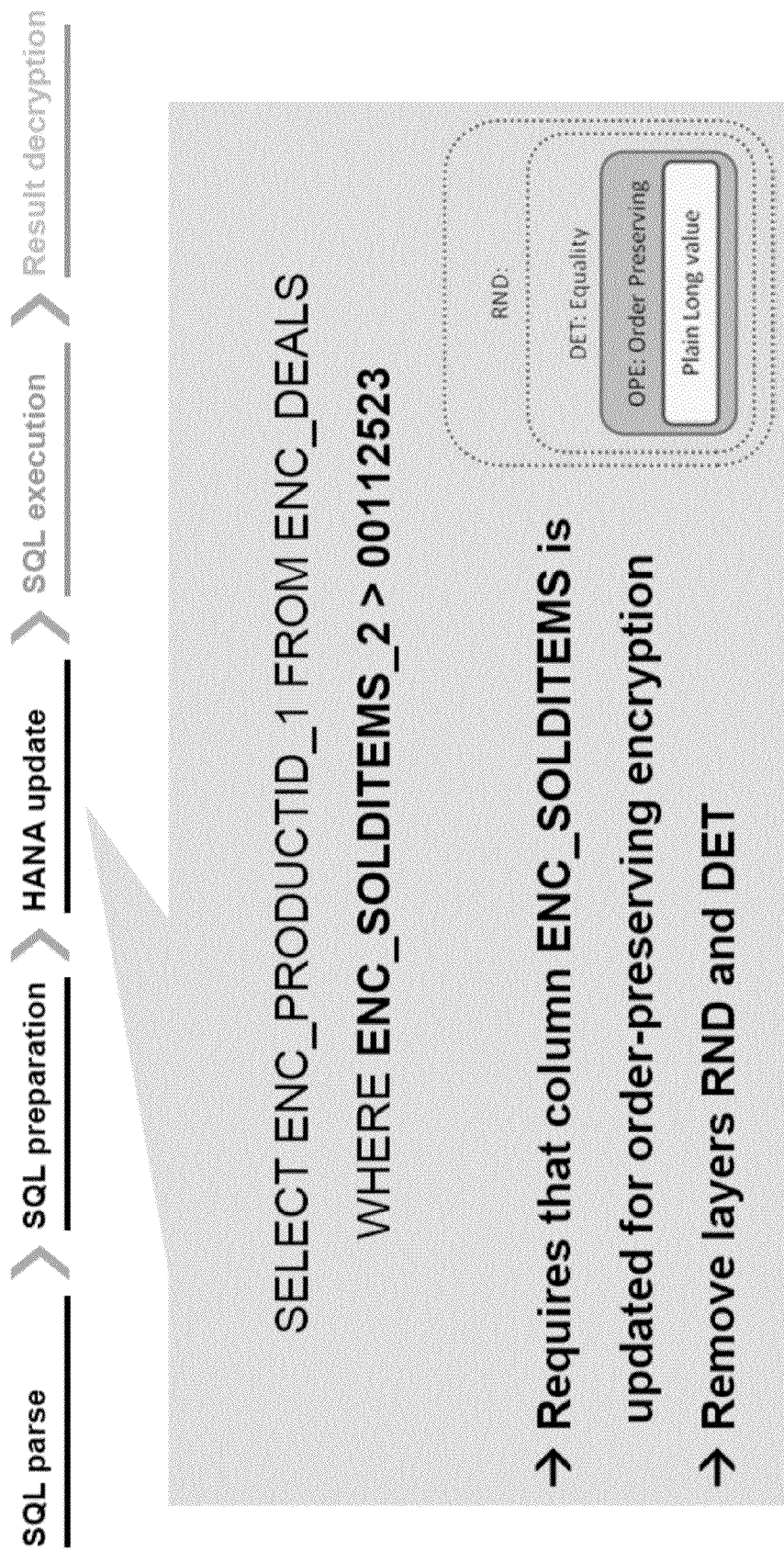

FIG. 3D shows the HANA update. In particular, an output of the engine comprises one (or more) encrypted SQLs for which the respective onions are selected.

Another output of the engine comprises a set of SQLs which are used to update the database. This ensures that the respective selected onions are on the required layer. Thus if onion #2 is selected for SOLDITEMS (because the layer OPE is required for the greater than expression), the onion ENC_SOLDITEMS_2 must be on its OPE layer.

The update-SQLs are sent to the database to remove the RND and DET layers before the actual encrypted SQL is sent to the database for execution.

Figure 3E:
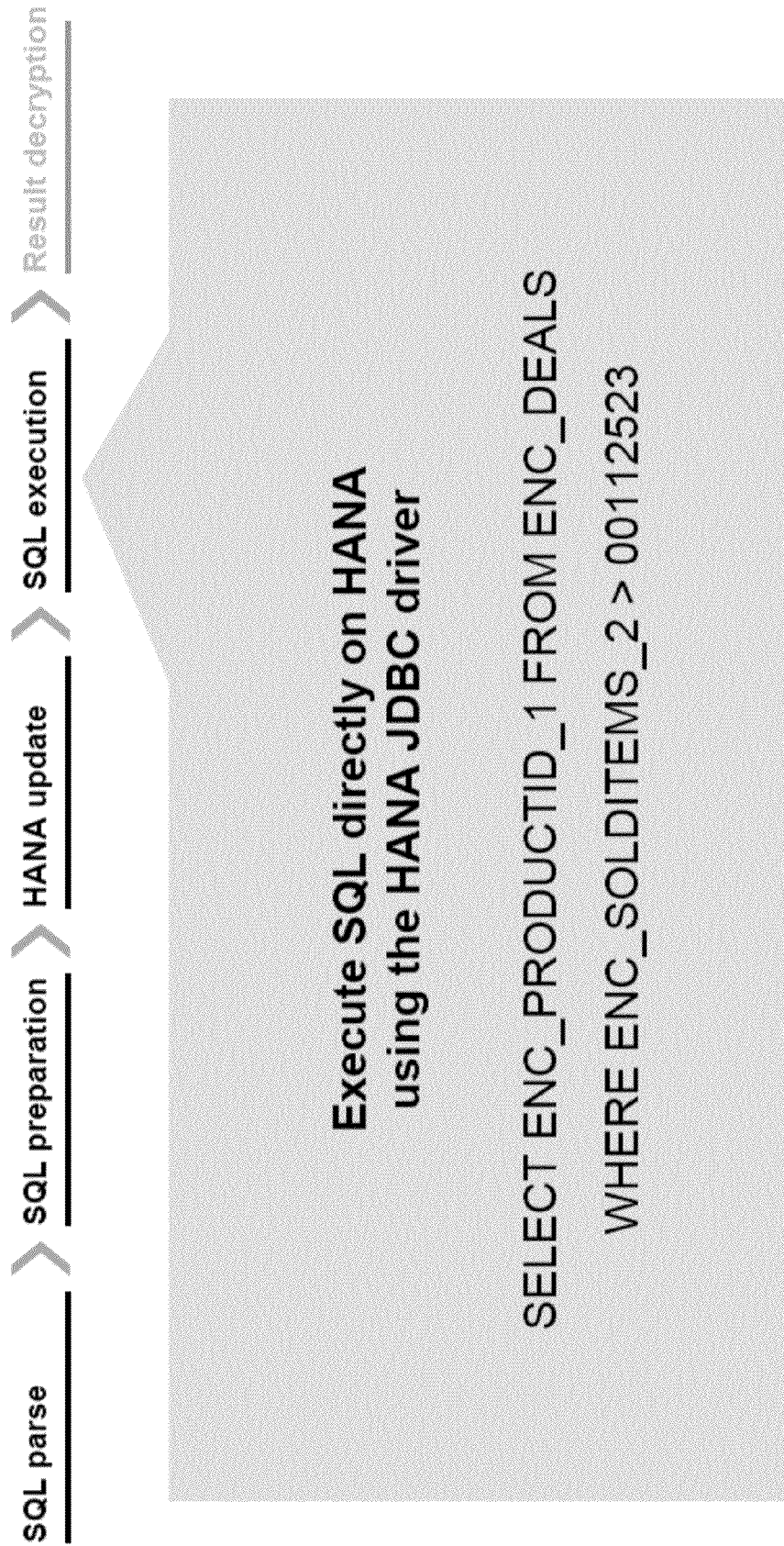
Figure 3F:
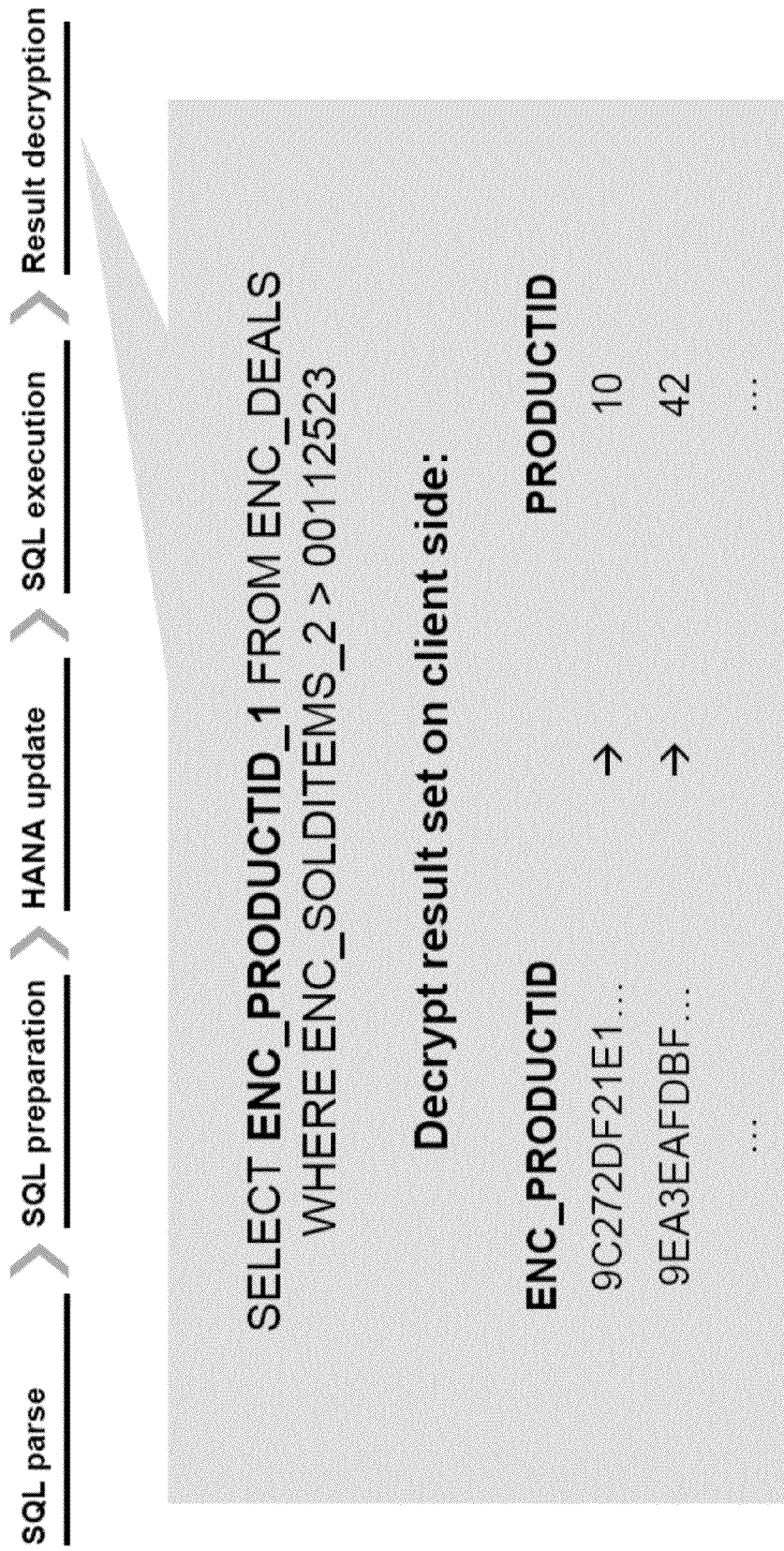

FIG. 3E shows execution of the encrypted SQL on the database to produce a query result. FIG. 3F shows corresponding decryption of this query result for ultimate display to the user.

Further details regarding an adjustable onion encryption function according to embodiments, is now provided. First, different varieties of multi-layered encryption schemes—serving as the basis for the "onion" around the data sought to be processed in encrypted form—are now described.

$E_C^T(x)$ is denoted as the ciphertext (encryption) of plaintext x in type T (e.g. order-preserving) with key C (usually for a column). The corresponding decryption is $D_C^T(c)$, i.e., $D_C^T(E_C^T(x))$ as in Dolev-Yao notation.

The key is sometimes omitted if it is a single key. All keys initially reside at the client. The database has no access to any key, unless revealed during the adjustment of encryption, i.e. "when peeling the onion".

A "standard" type of onion may comprise three (3) encryption types: order-preserving (OPE), deterministic (DET), and randomized (RND). This "standard" onion looks like the following:

$$E^{RND}(E_C^{DET}(E^{OPE}(x)))$$

The layers of this onion are described from the innermost—the plaintext—to the outermost—randomized encryption. The choice of this layering is not arbitrary.

In particular, each outer layer adds more security. That is, the better the onion is preserved, the better the security starting with industrial strength.

Each inner layer adds functionality. That is, inner layers allow more database operators to function as if on plaintext.

It is noted that inner layers preserve the functionality of all outer layers. That is, the inner layers do not remove any functionality.

The plaintext layer is described first. The plaintext x is treated as its own layer for at least two reasons.

A first reason for treating plaintext as its own layer, is that not each encryption type has the plaintext as the innermost layer. One example of this is searchable encryption as discussed further below.

A second reason for treating plaintext as its own layer is that this allows access to the plaintext to be made configurable. As described further below, a user may want to prevent access to the plaintext or not encrypt certain columns at all.

In summary, the plaintext layer allows processing of all queries. However, it provides no security.

The Order-Preserving Encryption (OPE) layer of the standard onion is now discussed. In particular, OPE preserves the order of the encryption:

$$x \leq y \iff E^{OPE}(x) \leq E^{OPE}(y)$$

The key is omitted since the same key is used for each column of the same data type. This allows JOINS using deterministic encryption of the upper layer.

Since the order is preserved, order-preserving encryption permits processing range queries on ciphertext in the same way as on plaintexts. Furthermore, since an order-preserving scheme may also be deterministic, it also still can process equality matching and JOINS.

The Deterministic Encryption (DET) encryption layer of the standard onion is now discussed. In particular, DET always produces the same ciphertext for a plaintext:

$$x = y \iff E_C^{OPE}(x) = E_C^{OPE}(y)$$

Deterministic encryption was the standard mode before the introduction of randomized encryption. It has been proven that only deterministic encryption can allow sublinear search. Therefore equality matches and JOINS can be performed on deterministically encrypted data more efficiently, that is using an unmodified database operator.

Deterministic encryption still allows statistical attacks. However, since the order is permuted, deterministic encryption is more secure than order-preserving encryption.

Initially, a different key C is used for each column. This prevents JOINS based on equality matches, since the columns are encrypted differently.

Proxy re-encryption is a technique to transform a ciphertext from key A to key B, without decrypting the ciphertext or needing to know any of the two keys A or B. This proxy re-encryption is used to adjust the encryption keys just before performing a JOIN operation.

The Randomized Encryption (RND) layer of the standard onion is now discussed. In particular, RND has become the standard mode of encryption.

In RND, randomization parameter ensures that each ciphertext (even from the same Plaintext) is indistinguishable. Embodiments may use the Advanced Encryption Standard (AES) in Cipher Block Chaining (CBC) mode for this RND encryption.

In summary, randomized encryption is the most secure. However, it allows no operation except retrieval to the client.

Alternatives to the OPE, DET, and RND encryption approaches just described, are available. Specifically, the layering of the onion does not need to be same in all cases, and outside of this "standard" onion, other encryption schemes may be necessary or useful. Such alternative encryption schemes are now discussed.

One alternative encryption scheme is homomorphic encryption. Homomorphic encryption allows arithmetic operations (most notably addition) using the ciphertexts.

In order to support aggregation without the plaintext, homomorphic encryption is incorporated. Certain embodiments may employ encryption scheme by Paillier, which allows only addition:

$$D^{HOM}(E^{HOM}(x) \cdot E^{HOM}(y)) = x+y$$

The following operation for multiplication by a plaintext can be readily derived $$D^{HOM}(E^{HOM}(x)^y) = x \cdot y$$

Paillier's encryption scheme is indistinguishable under chosen plaintext attack (as is randomized encryption). Therefore only a single key is necessary.

Furthermore, Paillier's encryption scheme is public key. However, particular embodiments keep the public key secret, and treat it like a secret key encryption scheme.

Some differences between the above (OPE, DET, RND) encryption schemes and homomorphic encryption, are now noted.

First, homomorphic encryption requires aggregation (sum operator) to be processed differently than on plaintexts. Additions are replaced by multiplication (actually modular multiplication). This requires implementation of a custom database operator.

A second difference from OPE, DET, and RND encryption is that for homomorphic encryption, the result of the database operator (the sum) remains encrypted. This precludes using this result in many subsequent operations (such as range queries). Queries using a chain of such operations need to be partially executed at the client on plaintext.

Another alternative encryption scheme is searchable encryption. Searchable encryption allows the private or secret key holder to issue a search token for a query plaintext. This search token can be used to match ciphertexts for plaintext equality or range inclusion to the query.

Unless a token has been issued, searchable encryption is as secure as randomized encryption. For the search token, however, the accessed ciphertexts are leaked.

Let $T^{SRC}(x)$ denote the search token and $M^{SRC}$ denote the matching operation.

$$x=/\neq y \Longleftrightarrow M^{SRC}(T^{SRC}(x), E^{SRC}(y)) = \top / \bot$$

According to embodiments, searchable encryption may be implemented using user-defined functions. Search time can be significantly improved by building an index. This, however, requires a modification of the database and hence embodiments may employ the linear search.

Searchable encryption need not be decryptable. According to various embodiments, the plaintext may be used to construct a key, and a random number is encrypted. Therefore searchable encryption may not be used for retrieval.

An efficiency of searchable encryption may be significantly lower than deterministic encryption. Therefore, it may not be desirable to include searchable encryption as an option for database operations. Before considering searchable encryption, a function may be called to make this decision.

In addition to functionality (as in homomorphic encryption) and security (as in searchable encryption), efficiency can also serve as a reason to add an onion.

For example, one bottleneck that may arise during encrypted query processing is decrypting the result on the client. It can therefore be more efficient to use a specific onion with efficient decryption. Embodiments may use AES in CBC mode as in randomized encryption, but directly on the plaintext.

When specifying the configuration of this onion, care must be taken not to use the plaintext for database operations unless intended. This may be accomplished by introducing a custom layer RET for retrieval.

Common configurations for a multi-layer encryption scheme (onions) are now discussed. As described above, different alternatives for encryption exist.

Embodiments seek to allow the user to configure its onions for a specific column. As it is too difficult to foresee all possible onion configurations and to capture all semantic restrictions of the encryption schemes, particular embodiments cater to a number of common onion configurations.

The algorithm has been successfully tested on these common onion configurations. However, other configurations are also possible and may work correctly.

Three options are foreseen. One option is for processing queries in the cloud. Another option is for strong encryption and processing queries on the client. A third option is for no security.

The option for processing queries in the cloud is described. This embodiment comprises four encryptions:

$O_1$: [RET]
$O_2$: [RND[DET[OPE]]]
$O_3$: [HOM]
$O_4$: [SRC]

According to certain embodiments, this option can be extended by omitting the OPE layer, and preventing from decryption to order-preserving encryption (while allowing deterministic encryption). Thus, such an extended option represents a "middle ground" between processing all queries in the cloud, and the next option of processing all queries at the client.

The option for strong encryption, requires all processing (except aggregation) to be processed at the client. Aggregation is done using homomorphic encryption—which is as secure as randomized encryption. Hence, it can be included without sacrificing security.

$O_1$: [RET]
$O_2$: [HOM]

The third option is to not use encryption at all. This approach can be employed for noncritical data, and increases the efficiency of processing.

Note that it is not possible to combine unencrypted data with the encrypted data in the cloud. This is because the query processing option does not include an accessible plaintext.

$O_1$: [PLN]

Selection of the onion is now discussed. In particular, the algorithm to select the onion layer (and corresponding database operator) for performing the query, is discussed.

The problem of onion selection is defined as follows. The client issues its query to its database driver. The database driver intercepts and analyzes the query.

The database driver constructs an initial query plan based on relation algebra of the query. This plan consists of a tree of database operators O.

The set of database operators includes projection (column selection), selection (where conditions for equality and ranges), joins (equality and ranges), grouping, sorting, aggregation (sum), union, and others.

Each database operator's input and output are tables. Each operator performs an operation on one or two columns. The semantic of this operation (e.g., an equality match), may be encoded in the operator's type.

Operators are connected into a tree. The root returns the result set of the query. The leaves are raw database tables (or views).

For each column, there is a configurable set of onions. These have been described above.

The original query executes on a virtual table that has been converted in the ciphertexts of this onion. Therefore, the query needs to be rewritten in order to return the same result as the original query on the original table.

Thus a definition of the onion selection problem is to select the onion layer for performing an equivalent operation on the encrypted data as part of the original query on plaintext data.

Embodiments seek to meet the following three requirements: policy configuration, alternative resolution, and conflict resolution. Each of these requirements is now described.

A policy configuration requirement refers to the ability of the user to control the onion selection. A typical policy could be a security policy to never reveal a plaintext in the cloud, or to never even reveal a non-randomized encryption.

These policies may be implemented indirectly via the configuration of the onions. For each column, the user can specify the onion. If an onion layer (e.g., plaintext) is not available, then it is a not an option for the onion selection algorithm.

Apart from security concerns, the configuration of the onion also has implications on efficiency and also perhaps functionality. A particular onion configuration therefore must be carefully chosen and tested.

An alternative resolution requirement refers to the availability of a multiple onion layers option for a corresponding plaintext database operation. A typical example is equality matching in a WHERE clause.

Such equality matching can be either fulfilled using deterministic encryption or searchable encryption. Deterministic encryption is more efficient; searchable encryption is more secure.

An onion selection algorithm according to embodiments makes a choice. This choice is to always select the most secure variant. If multiple variants of the same security exist, then the most efficient remaining variant is selected. This order is motivated by the purpose of encryption: to ensure security.

Furthermore, this imparts flexibility by allowing a user to influence the level of security utilizing the onion policy configuration.

A conflict resolution requirement refers to the situation where database operators are incompatible due to the encryption mode. One example is performing a range query on aggregated data, e.g.:

SELECT $x$ FROM $t$ GROUP BY $x$ HAVING
SUM($y$)>10.

The aggregation can only be computed using homomorphic encryption, which cannot be used for range queries on the client.

Another situation requiring conflict resolution, are JOINS between columns that use different onion configurations. Thus an onion for processing data in the cloud cannot be matched to plaintext, since there is no plaintext.

An onion selection algorithm according to embodiments needs to detect these types of situations. Furthermore, according to embodiments the algorithm follows a simple strategy to resolve these conflicts.

As many database operators as possible are executed on the server. Once there is a conflict, the intermediate result table will be transferred to the client. Processing continues there on the plaintexts. As such, all queries are executable at the expense of transferring (and decrypting) additional data.

One specific example of one algorithm that may be used to select a most secure onion layer, is now discussed.

In order to make a selection of the most secure onion layer, an order is imposed on the encryption layers. The innermost layer is referred to as the smallest or minimum layer. The outermost layer is referred to as the largest or maximum layer.

Let PLN be the plaintext layer.

$T$:RND,HOM,SRC,RET>DET>OPE>PLN

An algorithm according to an embodiment proceeds according to the following five (5) steps.
1) A graph of columns used in the query is built.
2) For each node of the graph, the maximum layer that can fulfill the query is selected.
3) For each connected component, the minimum layer necessary is selected.
4) If there are multiple parallel onions remaining, the remaining onion most efficient for the database operation, is chosen.
5) The operator tree is scanned from the leaves to the root. On the first conflict, the upper part is executed on the client.

Figure 4:
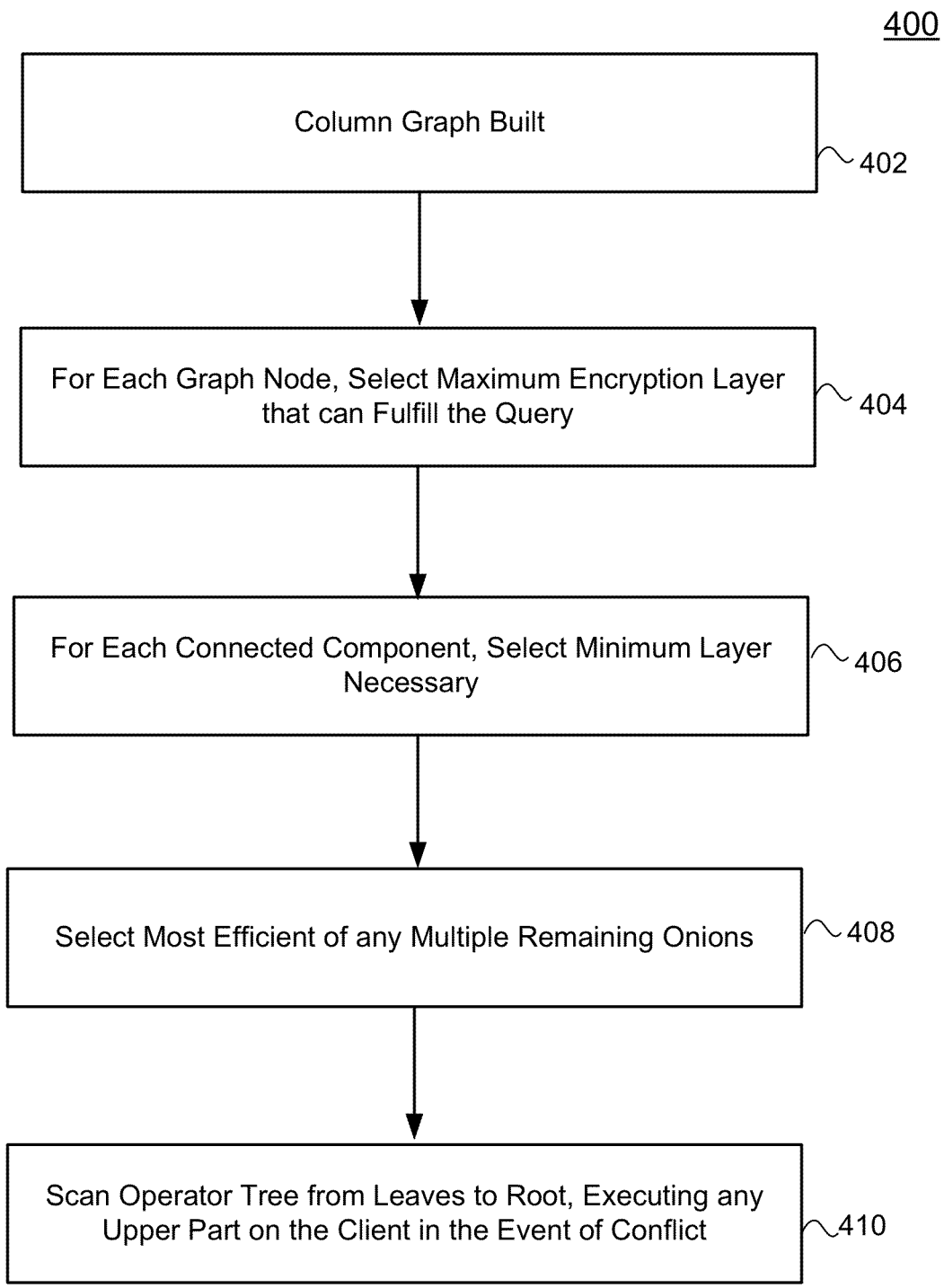
FIG. 4 is a simplified flow diagram illustrating steps of one specific onion selection algorithm according to an embodiment.

Each of these steps of this exemplary algorithm embodiment is now described in detail. These steps of an algorithm embodiment 400 are also shown in FIG. 4.

The first step 1) 402, is to build a column graph. A node for each raw table column used in the query is created. Such raw table columns may include columns selected, columns in WHERE or having conditions, groupings or sorted, or columns used in aggregation functions. Virtual columns for aggregations are not created.

For each node the onion configuration is retrieved and attached to the node as a structure. This may be multiple onions (as in a configuration for processing encrypted queries in the cloud).

The onion configuration is used as it is currently stored in the database. That is, a previous query may have already removed layers of onions.

An edge is created for each JOIN operator between the columns used in the condition or conditions. The resulting graph is undirected, but only in rare cases connected.

An example is the query:

SELECT $t1.x$,SUM($t2.y$) FROM $t1,t2$ WHERE
$t1.i$>10 AND $t1.i=t2.i$ GROUP BY $t1.x$.

This query uses the columns t1.x, t2.y, t1.i, and t2.i. In the resulting graph there is an edge between t1.i and t2.i.

The second step 2) 404 of the exemplary algorithm embodiment involves column layer selection. This step involves iterating through all operators in the tree.

For each operator, the onion and its associated onion structure are retrieved. Each operator has a type (and semantics) that imply one or more necessary onion layer. Examples are provided in the table above.

For the encryption type SRC, a specific function is called that determines whether it can be considered for this operator. If not, then it is not considered a match for the operator.

If none of these onion layers is currently accessible (because it is wrapped in another layer), onion layers are successively removed—starting with the topmost only—until a layer appears that fulfills the semantic requirements.

Already at this step 2), a conflict may arise when no onion layer for the operation is available. If so, then the structure is then marked as empty as an indication that there is a conflict.

It is assumed that layer removal increases the query processing functionality of the ciphertext. This needs to be considered when configuring the onions. Violating this assumption may cause the algorithm may fail.

Consider the example query from above:

SELECT $t1.x$,SUM($t2.y$) FROM $t1,t2$ WHERE
$t1.i$>10 AND $t1.i=t2.i$ GROUP BY $t1.x$

For simplicity assume that all onions use the same configuration for processing queries in the cloud. Furthermore, assume that no queries have been processed so far and state in the database is the initial state.

The first operator is a projection for t1.x. This can be fulfilled by RET, RND, DET, OPE, HOM, or PLN. There are multiple layers in the current onion structure and no modification is necessary.

The second operator is an aggregation on t2.y. This can be fulfilled by HOM or PLN. Again, such a layer is in the current onion structure and no modification is necessary.

In an alternative configuration, one could drop the homomorphic encryption. Then, there would be a conflict and the structure would end up empty.

The third operator is a range query on t1.i. This can be fulfilled by OPE or SRC.

Assume that searchable encryption is not an option due to the function call. Then, there is no such layer in the current onion structure. Therefore, the uppermost layers RND and DET are removed.

The fourth operator is a JOIN on equality matching. This can be fulfilled by DET, OPE, or PLN.

For t1.i such an OPE layer is in the current onion structure due to the third operator and no further modification is necessary. For t2.i no such layer is in the current onion structure. Therefore, the uppermost layer RND is removed.

The fifth operator is a grouping on t1.x. This can also be fulfilled by DET, OPE, or PLN. There are multiple layers in the current onion structure, and no modification is necessary.

Since the first operator made no modification, there is no such layer in the current onion structure. Therefore, the uppermost layer RND is removed.

The third step 3) 406 of the exemplary algorithm embodiment involves connected component selection. This step involves iterating through each connected component of the column graph.

For each node in a connected component, the onion structures are retrieved. For each onion, the minimum layer in any of the structures is selected. The resulting minimum onion structure is stored in all nodes of the connected component.

Note that the minimum for a common layer of deterministic encryption (DET) includes the use of a common key. This common is also computed and proxy re-encryption performed.

A conflict may be encountered here if the columns in a connected component use different configurations. Such a case results in aborting and leaving all onion structures as they are. This conflict is addressed in the step 5) of the algorithm.

The example is continued from above:

SELECT $t1.x$,SUM($t2.y$) FROM $t1,t2$ WHERE
$t1.i$>10 AND $t1.i=t2.i$ GROUP BY $t1.x$.

For the nodes t1.x and t2.y, no further action is required, since these are single nodes. The onion structure for t1.i includes OPE, whereas for t2.i it includes DET.

All are set to OPE. That is, all are set to the minimum and perform the JOIN on order-preserving encryption.

The fourth step 4) 408 of the exemplary embodiment algorithm involves alternative selection. This step again involves iterating through all of the operators in the tree.

For each operator, the most efficient onion layer of the available choices in the current onion structure is selected. The operator is marked with the selected onion layer.

All operators in the tree are iterated through a second time, and all onions that are used are marked. If a layer of an onion is supposed to be removed, but not used, the onion is restored in its structure to its current state, i.e., the layer removal will not be executed.

In the example from above, there is only one operator which can use multiple layers: projection of t1.x. This operator can use DET or RET. The most efficient is RET and hence it is used.

In some databases there is a semantic dependency between grouping and projection (or sorting). Only the same column can be used in both. That is, in the above example t1.x must be the same column in grouping operator and projection.

Nevertheless, the RET and the DET layers are in different onions and hence columns Certain embodiments capture this dependency using a specialized operator. Then, the minimum operator is used on the RET layer in order to return a unique result.

A fifth step 5) 410 in the exemplary algorithm embodiment, involves a local execution split. In particular, in this last step the operator tree is scanned from the leaves to the root.

If a conflict is encountered, the children of this operator are cut, and it and the parents are marked to be executed on the client. Examples of conflicts are now described.

One conflict arises if there is no onion layer to fulfill the operation. One type that that can occur in a "correct" configuration is an onion for processing on the client with an operator to be executed.

Another conflict is where the operation is on an aggregate function, but not the same aggregate function. A specific example of a conflict is:

SELECT $x$ FROM $t$ GROUP BY $x$ HAVING
SUM($y$)>10 with the onion configuration for processing in the cloud. Another conflict example is a JOIN operation on different onion configurations.

In the specific example referenced above, there are no such conflicts and the entire query is executed on the server. If a query is to be executed on the client, the subtrees rooted at its children are synthesized into SQL queries.

These queries are then executed. Their result is stored in local, temporary tables on the client.

The temporary tables are decrypted and the upper part of the query is synthesized. This query is then executed locally on the temporary tables.

Figure 5:
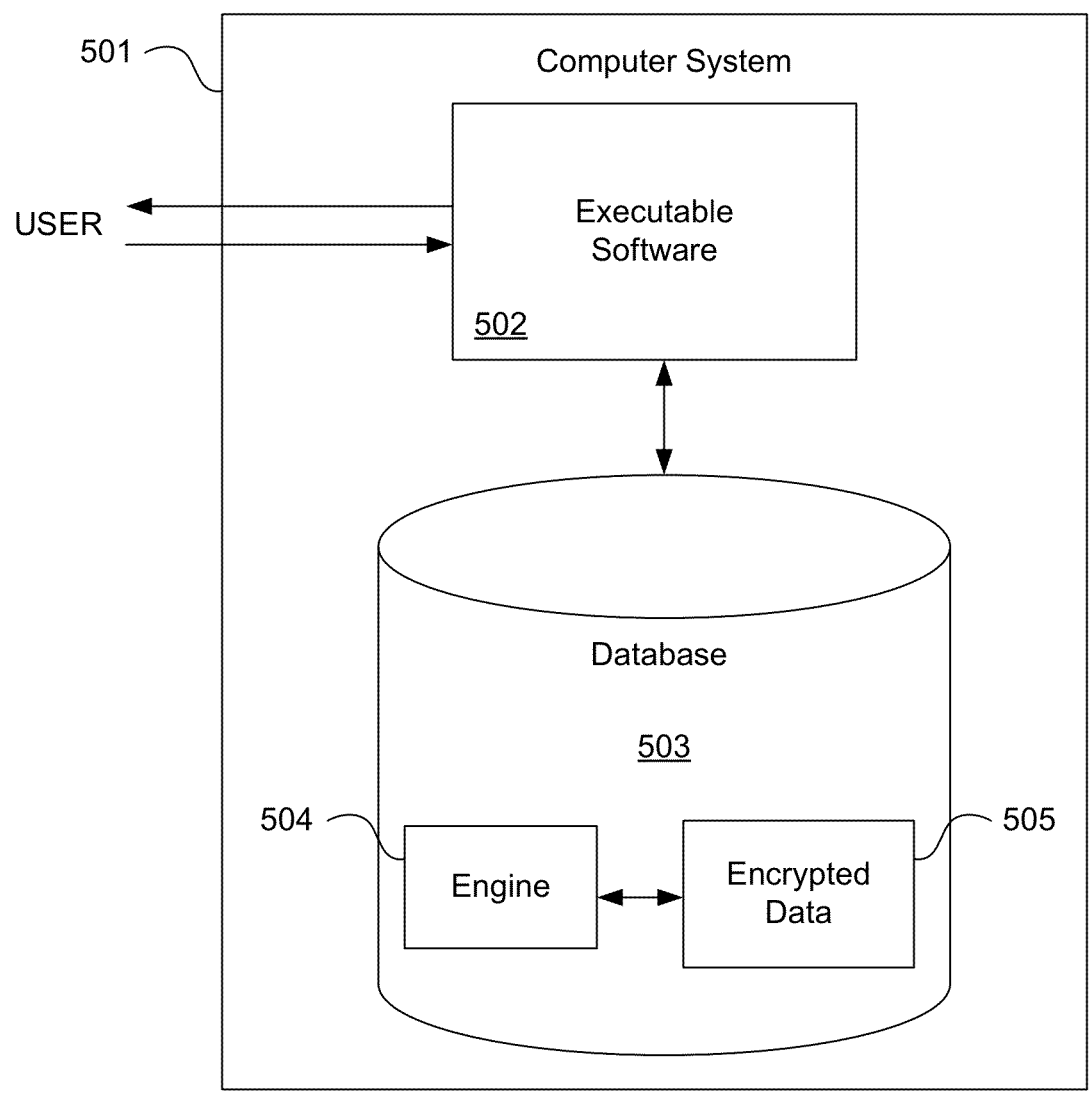
FIG. 5 illustrates hardware of a special purpose computing machine configured to implement processing of encrypted data according to an embodiment.

FIG. 5 illustrates hardware of a special purpose computing machine configured to implement encrypted in-memory column-store according to an embodiment. In particular, computer system 501 comprises a processor 502 that is in electronic communication with a non-transitory computer-readable storage medium 503. This computer-readable storage medium has stored thereon code 504 corresponding to an engine. Code 305 corresponds to a database table comprising encrypted plaintext. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
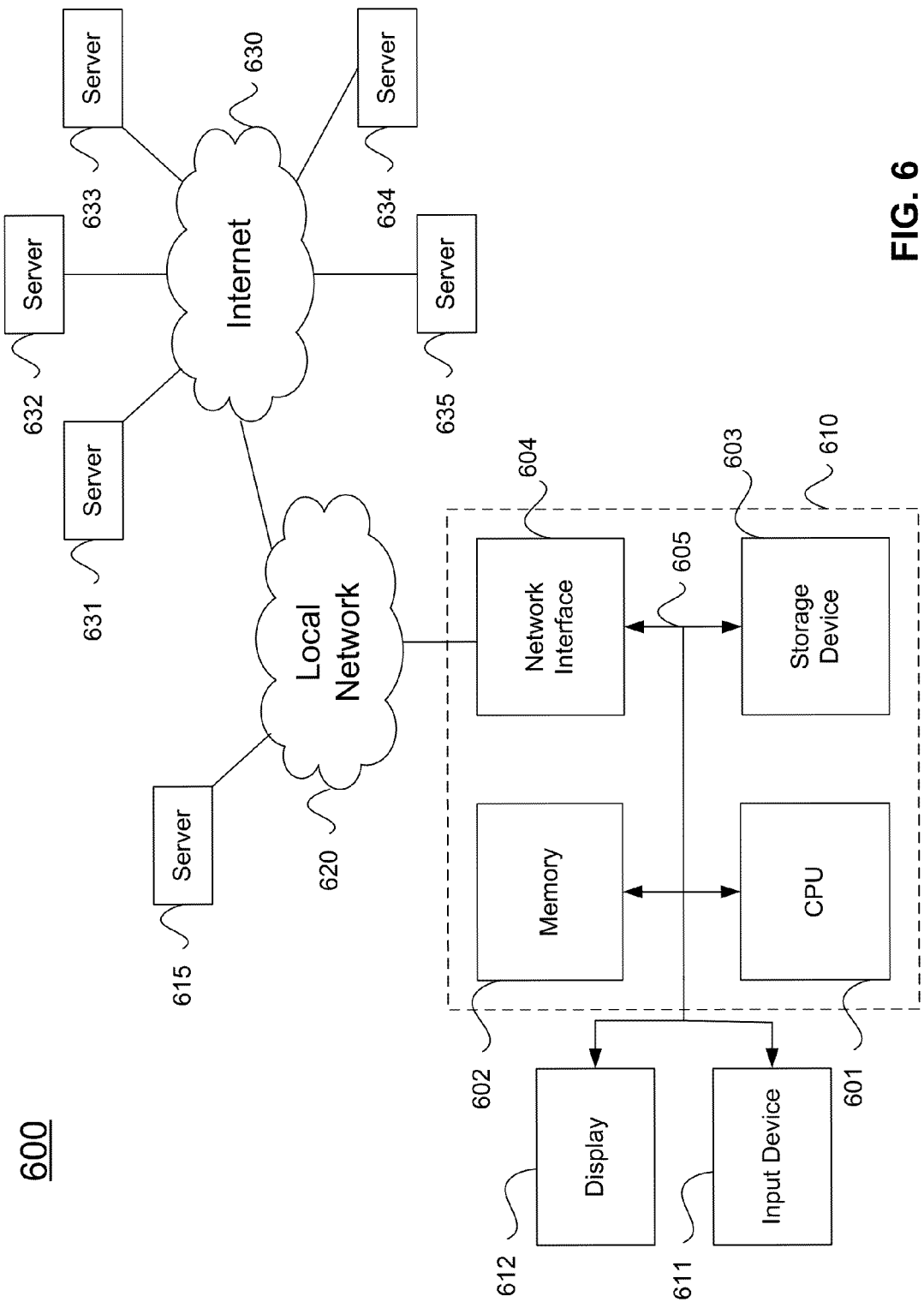
FIG. 6 illustrates an example of a computer system.

An example system 600 for implementing an embodiment, is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

In summary, embodiments may introduce extensions over conventional approaches. One extension allows the user to configure the onion in almost arbitrary ways directing the onion selection. Another extension introduces a local execution split in order to allow queries that cannot be otherwise fulfilled. Still another extension allows the use of searchable encryption.

Embodiments employing extensions may make available multiple or none encryption layers for executing the query. Furthermore, embodiments may handle all SQL queries by executing them on the client. Embodiments may also increase security by using searchable encryption instead of deterministic or order-preserving encryption.

In order to reduce a possibility of misconfiguration by the user, embodiments may be employed in conjunction with a tool that checks the most important semantic constraints of an onion configuration. This tool can check for the most common problems, and provide a warning in case it does not recognize a configuration.

Certain embodiments may find use in allowing collaboration in an encrypted database. Consider, for example, a situation where a number of organizations seek to join forces in intrusion detection. Each organization may want to share selected events with certain other organizations. Still, all data is to be stored centrally in the cloud.

Other possible applications for various embodiments as described herein, include but are not limited to benchmarking and supply chain management.

It is further noted that embodiments perform some optimization. Specifically, as described above particular embodiments may consider security first, and then efficiency. However, other embodiments may investigate alternative approaches to make such optimization choices.

The above description illustrates various embodiments along with examples of how aspects of embodiments may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   providing a database comprising encrypted plaintext;
   causing an engine to receive a first input comprising a database query including an expression;
   causing the engine to receive a second input comprising the plaintext encrypted according to a first encryption scheme;
   causing the engine to receive a third input comprising the plaintext encrypted according to a second encryption scheme; and
   causing the engine to process the expression, the first encryption scheme, and the second encryption scheme according to an algorithm in order to select an encrypted layer on which to execute the database query.

2. The computer-implemented method of claim 1 wherein the algorithm comprises:
   building a graph of columns used in the database query;
   for each graph node, selecting a maximum encrypted layer that can fulfill the database query;
   selecting a minimum encrypted layer necessary for each connected component;
   choosing a remaining encryption most efficient for database operation; and
   scanning an operator tree of the database query from leaves to root,
   wherein the database is on a server, and upon encountering a conflict an upper part of the operator tree is executed on a client.

3. The computer-implemented method of claim 1 wherein:
   the engine processes the expression to further output an encrypted database query to execute on the encrypted layer; and
   the method further comprises executing the encrypted database query on the encrypted layer to produce an encrypted query result.

4. The computer-implemented method of claim 1 wherein the expression comprises aggregation, and the selected encryption layer comprises homomorphic encryption.

5. The computer-implemented method of claim 1 wherein the expression comprises a bound, and the selected encryption layer comprises order preserving encryption.

6. The computer-implemented method of claim 1 wherein the expression comprises a search function, and the selected encryption layer comprises searchable encryption.

7. The computer-implemented method of claim 1 wherein plaintext of the selected encryption layer is initially encrypted by order preserving encryption.

8. A non-transitory computer readable storage medium embodying a computer program for performing a method, said method comprising:
   providing a database comprising encrypted plaintext;
   causing an engine to receive a first input comprising a database query including an expression;
   causing the engine to receive a second input comprising the plaintext encrypted according to a first encryption scheme;
   causing the engine to receive a third input comprising the plaintext encrypted according to a second encryption scheme; and causing the engine to process the expression, the first encryption scheme, and the second encryption scheme according to an algorithm in order to select an encrypted layer on which to execute the database query.

9. A non-transitory computer readable storage medium as in claim 7 wherein the algorithm comprises:
building a graph of columns used in the database query;
for each graph node, selecting a maximum encrypted layer that can fulfill the database query;
selecting a minimum encrypted layer necessary for each connected component;
choosing a remaining encryption most efficient for database operation; and
scanning an operator tree of the database query from leaves to root,
wherein the database is on a server, and upon encountering a conflict an upper part of the operator tree is executed on a client.

10. A non-transitory computer readable storage medium as in claim 7 wherein the method further comprises:
processing the expression to further output an encrypted database query to execute on the encrypted layer; and
executing the encrypted database query on the encrypted layer to produce an encrypted query result.

11. A non-transitory computer readable storage medium as in claim 7 wherein the expression comprises aggregation, and the selected encryption layer comprises homomorphic encryption.

12. A non-transitory computer readable storage medium as in claim 7 wherein expression comprises a bound, and the selected encryption layer comprises order preserving encryption.

13. A non-transitory computer readable storage medium as in claim 7 wherein the expression comprises a search function, and the selected encryption layer comprises searchable encryption.

14. A non-transitory computer readable storage medium as in claim 7 wherein plaintext of the selected encryption layer is initially encrypted by order preserving encryption.

15. A computer system comprising:
one or more processors;
a software program, executable on said computer system, the software program configured to:
provide a database comprising encrypted plaintext;
cause an engine to receive a first input comprising a database query including an expression;
cause the engine to receive a second input comprising the plaintext encrypted according to a first encryption scheme;
cause the engine to receive a third input comprising the plaintext encrypted according to a second encryption scheme; and
cause the engine to process the expression, the first encryption scheme, and the second encryption scheme according to an algorithm in order to select an encrypted layer on which to execute the database query.

16. A computer system as in claim 15 wherein the algorithm comprises:
building a graph of columns used in the database query;
for each graph node, selecting a maximum encrypted layer that can fulfill the database query;
selecting a minimum encrypted layer necessary for each connected component;
choosing a remaining encryption most efficient for database operation; and
scanning an operator tree of the database query from leaves to root,
wherein the database is on a server, and upon encountering a conflict an upper part of the operator tree is executed on a client.

17. A computer system as in claim 15 wherein:
the engine processes the expression to further output an encrypted database query to execute on the encrypted layer; and
the software program is further configured to execute the encrypted database query on the encrypted layer to produce an encrypted query result.

18. A computer system as in claim 15 wherein the expression comprises aggregation, and the selected encryption layer comprises homomorphic encryption.

19. A computer system as in claim 15 wherein the expression comprises a bound, and the selected encryption layer comprises order preserving encryption.

20. A computer system as in claim 15 wherein the expression comprises a search function, and the selected encryption layer comprises a searchable encryption.

* * * * *